(12) United States Patent
Xiao et al.

(10) Patent No.: US 9,912,715 B2
(45) Date of Patent: Mar. 6, 2018

(54) METHOD AND MULTI-MEDIA DEVICE FOR VIDEO COMMUNICATION

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Xing-Hua Xiao, Shenzhen (CN); Chi-Ming Lu, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 134 days.

(21) Appl. No.: 14/983,599

(22) Filed: Dec. 30, 2015

(65) Prior Publication Data

US 2016/0191593 A1 Jun. 30, 2016

(30) Foreign Application Priority Data

Dec. 31, 2014 (CN) .......................... 2014 1 0851887

(51) Int. Cl.
*H04M 3/56* (2006.01)
*H04L 29/06* (2006.01)
*H04L 29/08* (2006.01)

(52) U.S. Cl.
CPC ............ *H04L 65/602* (2013.01); *H04L 65/80* (2013.01); *H04L 67/303* (2013.01); *H04M 3/567* (2013.01)

(58) Field of Classification Search
CPC ..... H04L 65/602; H04L 65/80; H04L 67/303; H04M 3/567
See application file for complete search history.

(56) References Cited

U.S. PATENT DOCUMENTS

| 8,320,901 | B2 * | 11/2012 | Klein | ............... | H04M 1/72533 |
| | | | | | 348/734 |
| 8,942,495 | B2 * | 1/2015 | Wang | ...................... | G06T 9/004 |
| | | | | | 382/233 |
| 9,031,847 | B2 * | 5/2015 | Sarin | ....................... | G10L 15/22 |
| | | | | | 704/275 |
| 2002/0143975 | A1 * | 10/2002 | Kimura | ............. | H04L 29/06027 |
| | | | | | 709/231 |
| 2010/0238264 | A1 * | 9/2010 | Liu | .................... | H04N 13/0011 |
| | | | | | 348/14.13 |

(Continued)

FOREIGN PATENT DOCUMENTS

TW 201101738 A 1/2011
TW 201445996 A 12/2014

*Primary Examiner* — Ricky Ngo
*Assistant Examiner* — Lan Huong Truong
(74) *Attorney, Agent, or Firm* — ScienBiziP, P.C.

(57) ABSTRACT

A method for two-way video communication between devices is executable by a multi-media device. The multi-media device obtains configuration information of hardware of all devices. The multi-media device obtains first voice data and first image data from a first device, transforms the first voice data and the first image data into second voice data and second image data recognizable by other remote communication devices. A multi-media device without microphone and camera can achieve video communications between local and remote communication devices.

12 Claims, 7 Drawing Sheets

(56) References Cited

U.S. PATENT DOCUMENTS

| | | | | |
|---|---|---|---|---|
| 2011/0061078 A1* | 3/2011 | Rothschild | ............. | G11B 27/11 |
| | | | | 725/51 |
| 2013/0088560 A1* | 4/2013 | Karnalkar | ............. | H04N 7/142 |
| | | | | 348/14.02 |
| 2013/0235196 A1* | 9/2013 | Yang | ............. | H04N 7/183 |
| | | | | 348/143 |
| 2014/0038527 A1* | 2/2014 | Chen | ............. | H04W 4/008 |
| | | | | 455/41.3 |
| 2015/0162007 A1* | 6/2015 | Hwang | ............. | G06F 3/167 |
| | | | | 704/273 |
| 2015/0271228 A1* | 9/2015 | Lam | ............. | H04L 65/60 |
| | | | | 709/203 |
| 2015/0358577 A1* | 12/2015 | Zhou | ............. | H04L 51/10 |
| | | | | 348/14.01 |

* cited by examiner

METHOD AND MULTI-MEDIA DEVICE FOR VIDEO COMMUNICATION

FIELD

The subject matter herein generally relates to video collection and transmission.

BACKGROUND

An internet medium player, a set-top box, and other multi-media device are equipped in many family. Users may want to make a video of their own. Most multi-media devices are not equipped with the units such as a camera and a microphone, to make and transmit a video communication. The user needs to add camera and microphone to the multi-media device via wires, or through BLUETOOTH, or through a wireless network. The multi-media device by this way required a camera with perfect angle and focus, a program, a wide radio frequency band or bands to make the audio and video with no distorting.

BRIEF DESCRIPTION OF THE DRAWINGS

Implementations of the present technology will now be described, by way of example only, with reference to the attached figures, wherein.

DETAILED DESCRIPTION

Figure 1:
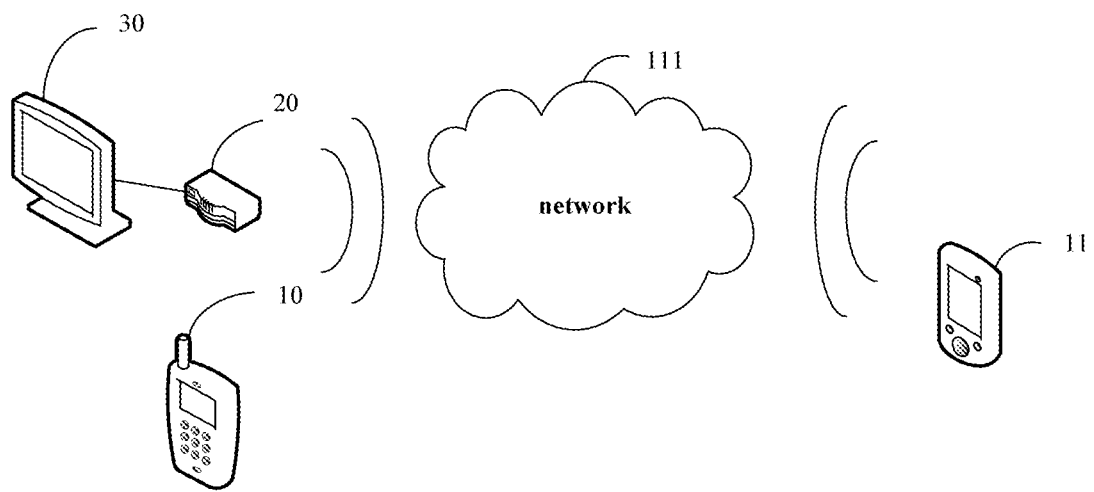
FIG. 1 illustrates a diagrammatic view of an operating environment of one embodiment of a multi-media device, in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

Embodiments of a multi-media device and a method for video communication are described.

FIG. 1 illustrates an operating environment of one embodiment of a multi-media device 20. In the illustrated embodiment, the multi-media device 20 is placed in a wireless network 111 (e.g. 4G, WIFI), and communicates with a mobile device 10 and with a remote communication device 11 via the wireless network 111. In addition, the multi-media device 20 is electrically connected by wires with a display device 30. In another embodiment, the multi-media device 20 can be electrically connected with the display device 30 via the wireless network 111. In the illustrated embodiment, the wireless network 111 can be the wireless local area network 111 (e.g. WIFI), 3G/4G, or the like. The mobile device 10 can be equipped with a wireless transmission function. The mobile device 10 can be a device such as tablet computer (e.g. IPAD) or Smart Phone with a camera, a microphone, a loudspeaker, and other hardware.

In the illustrated embodiment, the mobile device 10 sends a command of connection to the multi-media device 20. The multi-media device 20 establishes a communication with the mobile device 10 after receiving the command from the mobile device 10. The multi-media device 20 sends a control command to the mobile device 10 to obtain the information about the hardware configuration of the camera, the microphone, the loudspeaker, and other hardware of the mobile device 10, and completes a video communication process with the mobile device 10 according to the configuration information. The multi-media device 20 also communicates with the remote communication device 11 selected by the user.

The remote communication device 11 can be another mobile device which has a camera, a microphone, and a loudspeaker. In this way, one multi-media device 20 can communicate with several mobile devices 10 to build a video communication with several users, and one mobile device 10 can communicate, synchronously, with several multi-media devices 20.

In this embodiment of the present disclosure, the video communication takes place in the situation of one multi-media device 20, one mobile device 10, and one remote communication device 11. The multi-media device 20 controls the mobile device 10 to obtain voice data via the microphone and capture image data via the camera when the matching of the communication and the connection between the mobile device 10 and the multi-media device 20 are completed. Then the multi-media device 20 controls the mobile device 10 to send voice data and image data to the multi-media device 20 via the wireless network 111.

The data obtained by mobile device 10 cannot be directly played on the remote communication device 11. The multi-media device 20 therefore transforms the data obtained by the mobile device 10 into data recognizable by the remote communication device 11. The multi-media device 20 transforms the voice data obtained by the mobile device 10 into voice data appropriate for the information about the hardware configuration of the remote communication device 11. Then the multi-media device 20 sends the transformed voice data to the remote communication device 11, so that playback of the transformed voice data can occur on the remote communication device 11. The multi-media device 20 transforms the image data obtained by the mobile device 10 into image data appropriate for the information about the hardware configuration of the remote communication device 11 and the display device 30. Then the multi-media device 20 sends the transformed image data to the remote communication device 11 and the display device 30 to play.

In the illustrated embodiment, after the remote communication device 11 plays the transformed voice and image data received from the multi-media device 20, the multi-media device 20 receives voice data and image data of a user from a remote communication device 11. The multi-media device 20 transforms the voice data received from the remote communication device 11 into voice data appropriate for the information about the hardware configuration of the loudspeaker of the mobile device 10, and then sends the transformed voice data to the mobile device 10 to play. The multi-media device 20 transforms the image data received from the remote communication device 11 into image data appropriate for the information about the hardware configuration of the display device 30. Then, the multi-media device 20 sends the transformed image data to the display device 30 to play. Therefore, the multi-media device 20 obtains the configuration information of hardware of the mobile device, then processes the overall video data obtained by the mobile device and transforms the overall data into data recognizable by the remote communication device. Two-way remote video communication with a remote communication device is thus executed by the multi-media device 20.

Figure 2:
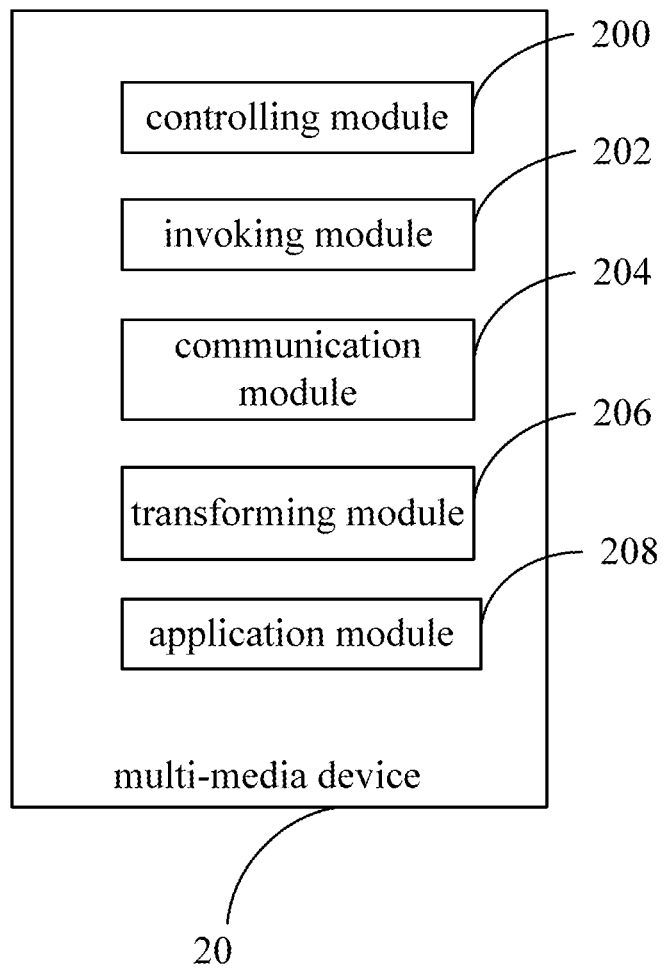
FIG. 2 is a functional block diagram of a multi-media device according to one embodiment of the disclosure.

FIG. 2 is a functional block diagram of a multi-media device 20 according to one embodiment of the disclosure. In the illustrated embodiment, the multi-media device 20 includes a processor and a non-transitory storage system, wherein the non-transitory storage system is configured to store a controlling module 200, an invoking module 202, a communication module 204, a transforming module 206, and an application module 208. The modules 200-208 are executed by the at least one processor.

Figure 3:
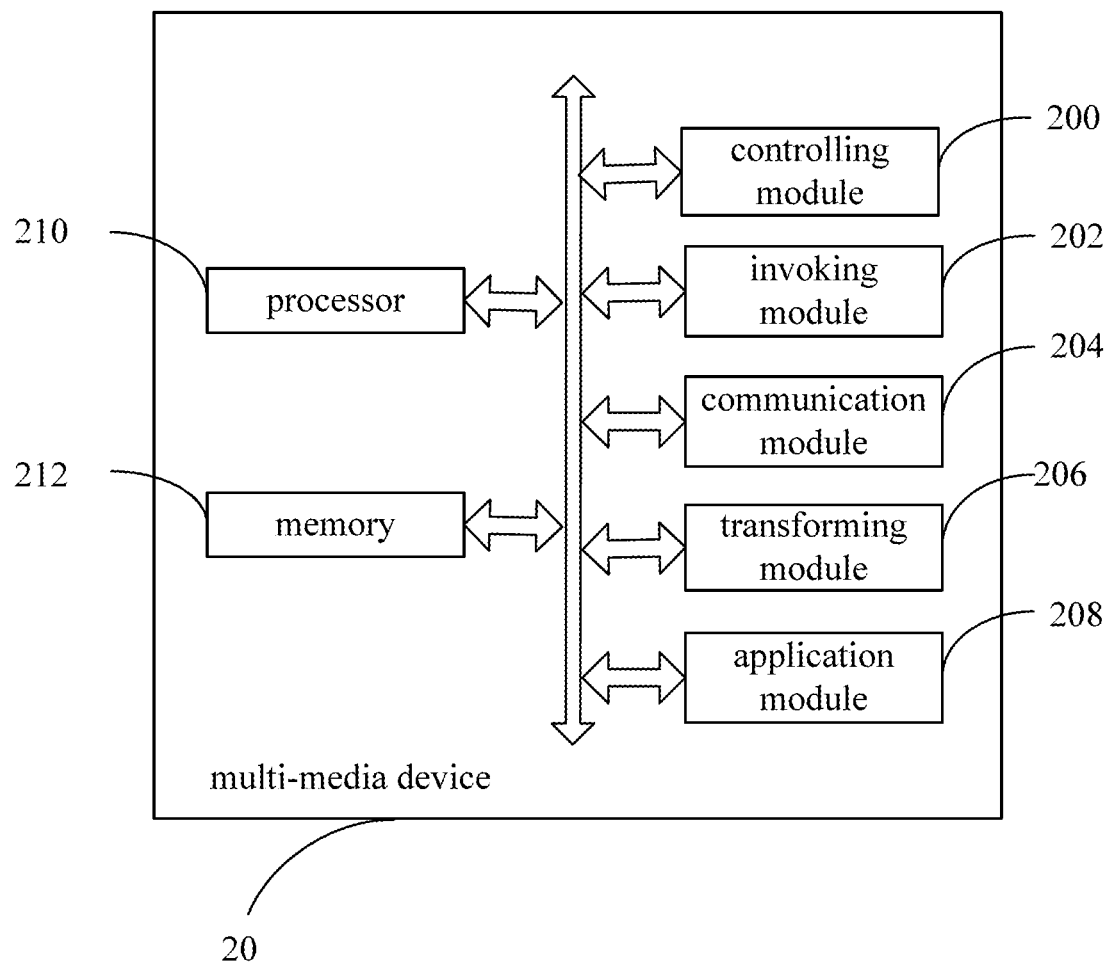
FIG. 3 is another functional block diagram of a multi-media device according to one embodiment of the disclosure.

FIG. 3 is another functional block diagram of a multi-media device according to one embodiment of the disclosure. In the illustrated embodiment, the multi-media device 20 includes a processor and a non-transitory storage system, wherein the non-transitory storage system is configured to store a controlling module 200, an invoking module 202, a communication module 204, a transforming module 206, an application module 208, a processor 210, and a memory 212. The modules 200-208 are executed by the at least one processor. In the illustrated embodiment, the multi-media device 20 includes a controlling module 200, an invoking module 202, a communication module 204, a transforming module 206, an application module 208, a processor 210, and a memory 212. The controlling module 200, the invoking module 202, the communication module 204, the transforming module 206, and the application module 208 together have the same functions as the controlling module 200, the invoking module 202, the communication module 204, the transforming module 206, and the application module 208 illustrated in FIG. 2. The memory 212 stores the software codes of each module and configuration information of the respective hardware of the mobile device 10, the display device 30, and the remote communication device 11. The hardware of the mobile device 10 includes the microphone 104, the loudspeaker 102, and the camera 106. The memory 212 also stores the overall video data received from the mobile device 10. The processor 210 execute the software codes to achieve the functions of the modules.

Figure 4:
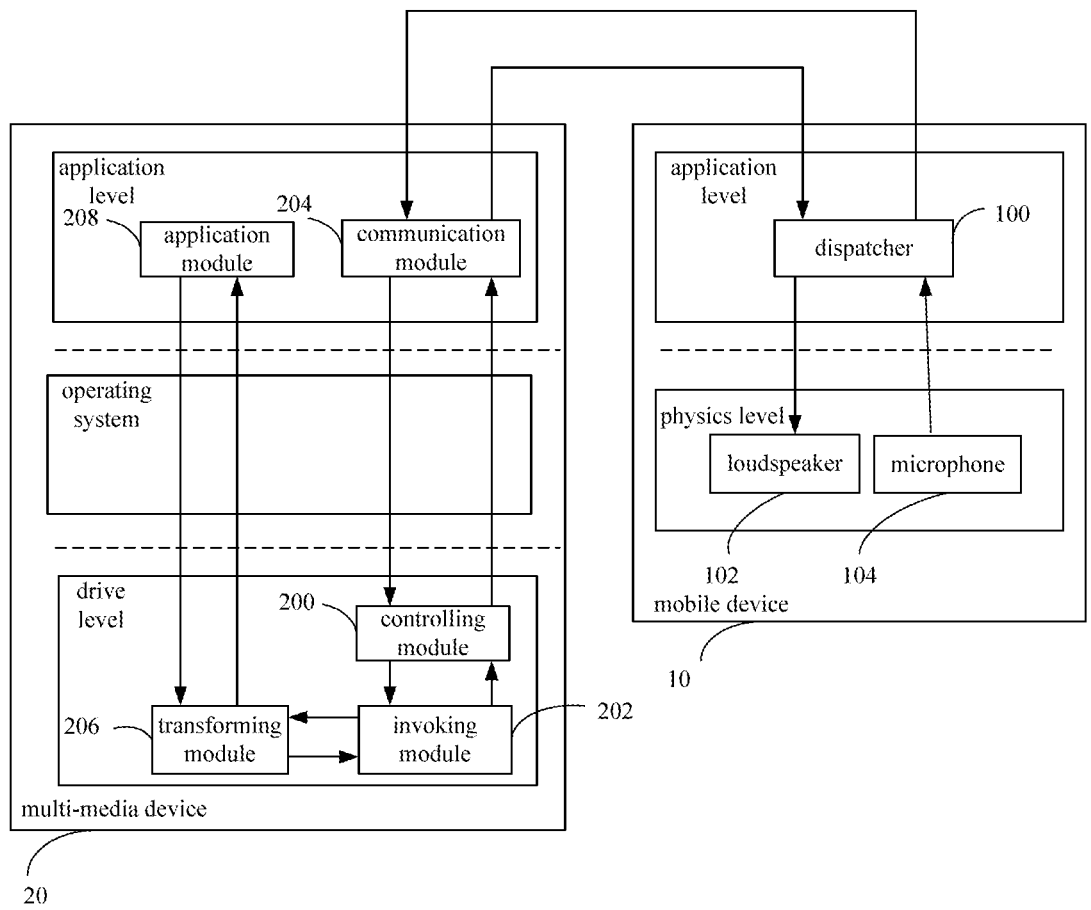
FIG. 4 is a framework diagram of the transmission of voice data by a multi-media device in accordance with one embodiment of the disclosure.
Figure 5:
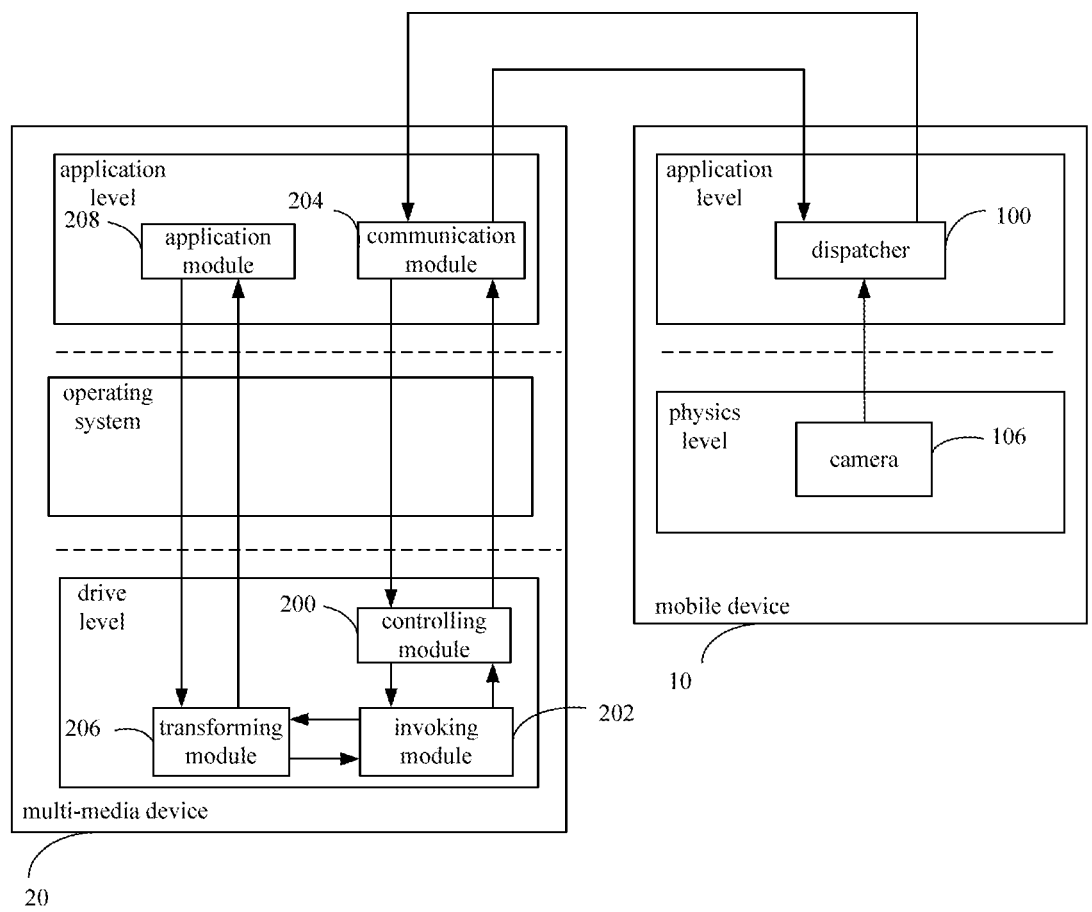
FIG. 5 is a framework diagram of the transmission of image data by a multi-media device in accordance with one embodiment of the disclosure.

FIG. 4 shows the transmission of voice data by a multi-media device in accordance with one embodiment of the disclosure. FIG. 5 shows the transmission of image data by a multi-media device in accordance with one embodiment of the disclosure.

In the illustrated embodiment, the multi-media device 20 is electrically connected by wires with the display device 30, and communicates with the mobile device 10 via the wireless network 111. The multi-media device 20 communicates with the remote communication device 11 after communication between the multi-media device 20 and the mobile device 10 is established. When intercommunication between all devices is established, the controlling module 200 connects with the mobile device 10, the remote communication device 11, and the display device 30. Then the controlling module 200 sends control commands to the mobile device 10, the display device 30, and the remote communication device 11 to obtain information as to respective hardware configurations of the mobile device 10, the display device 30, and the remote communication device 11. The configuration information of the mobile device 10 includes configuration information of the microphone, the camera, and the loudspeaker. Then the multi-media device 20 starts the process of the video communication when the configuration information of the all the devices is obtained. In the illustrated embodiment, the process of communication is shown in FIG. 4 and FIG. 5.

Referring to FIG. 4, the invoking module 202 obtains the configuration information of the microphone 104 of the mobile device 10, then sends invoking commands to the mobile device 10 to activate the microphone 104 of the mobile device 10. The mobile device 10 sends the first voice data to the communication module 204 of the multi-media device 20 through a dispatcher 100 located in the application level of the mobile device 10 via the wireless network 111. The communication module 204 of the multi-media device 20 receives the first voice data, then sends the first voice data to the transforming module 206 located in the drive level. The transforming module 206 decodes the first voice data according to the appropriate code form of the mobile device 10, then encodes the first voice data into second voice data to be recognized by the remote communication device 11 according to the configuration information of the hardware of the remote communication device 11. The transforming module 206 sends the second voice data to the application module 208 located in the application level. The application module 208 sends the second voice data wirelessly to the remote communication device 11 to play.

Referring to FIG. 5, when the invoking module 202 activates the microphone 104 of the mobile device 10, the invoking module 202 also obtains the configuration information of the camera 106 of the mobile device 10, and controls the camera 106 to capture first image data. After the first image data is obtained, the mobile device 10 sends the first image data through a dispatcher 100 which is located in the application level of the mobile device 10 to the communication module 204 of the multi-media device 20 via the wireless network 111. The communication module 204 of the multi-media device 20 receives the first image data, then sends such data to the transforming module 206 located in the drive level. The transforming module 206 decodes such data according to the appropriate code form of the mobile device 10, then encodes the first image data into second image data, to be recognized by the remote communication device 11. The transforming module 206 sends the second image data to the application module 208 located in the application level. The application module 208 sends the second image data wirelessly to the remote communication device 11 to play.

In addition, the transforming module 206 decodes the first image data according to the code form of the mobile device 10, and also encodes the first image data into third image data recognizable by the display device 30 according to the configuration information of the hardware of the display device 30. The transforming module 206 sends the third image data to the application module 208 located in the application level. The application module 208 sends the third image data to the display device 30 to play.

Referring to FIG. 4, the application module 208 sends the fourth voice data to the transforming module 206 after receiving the fourth voice data from the remote communication device 11. The transforming module 206 decodes the fourth voice data according to the appropriate code form of the remote communication device 11, then encodes the decoded fourth voice data into fifth voice data recognizable by the mobile device 10 according to the configuration information of the hardware of the mobile device 10. The transforming module 206 sends the fifth voice data to the communication module 204. Then the communication module 204 sends the fifth voice data to the dispatcher 100 of the mobile device 10, and the dispatcher 100 plays the fifth voice via the loudspeaker 102.

Referring to FIG. 5, the application module 208 sends the fourth image data to the transforming module 206 after receiving the fourth image data from the remote communication device 11. The transforming module 206 decodes the fourth image data according to the appropriate code form of the remote communication device 11, then encodes the decoded fourth image data into fifth image data recognizable by the display device 30 according to the configuration information of the hardware of the display device 30. The transforming module 206 sends the fifth image data to the communication module 204. Then the communication module 204 sends the fifth image data to the display device 30 to play.

Figure 6:
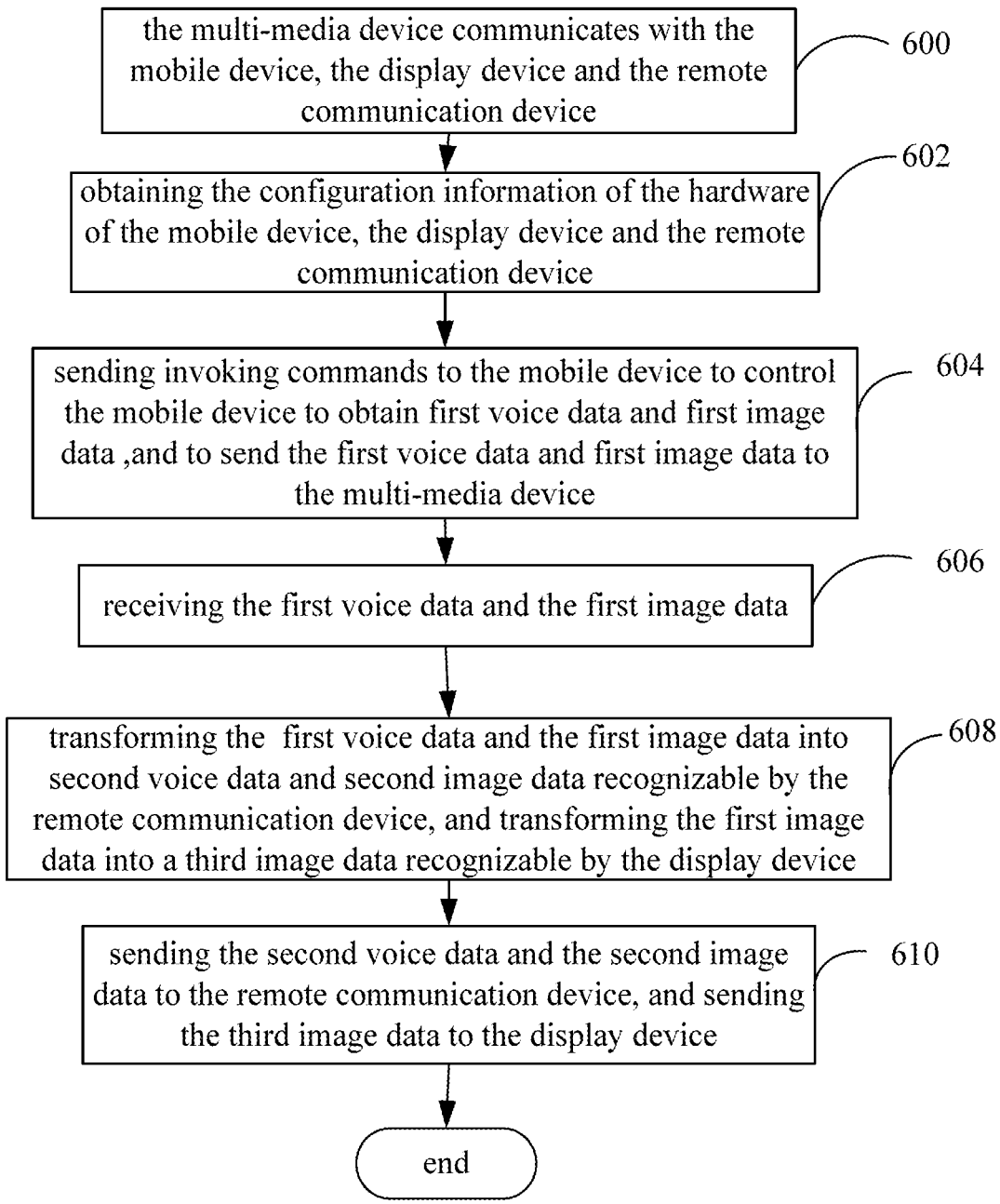
FIG. 6 is a flowchart of processes of a multi-media device transmitting voice data and image data to a remote communication device, in accordance with one embodiment of the disclosure.

FIG. 6 is a flowchart of the processes of a multi-media device transmitting a voice data and image data to a remote communication device, in accordance with one embodiment of the disclosure. The processes show in FIG. 6 are executed in the environment showed in FIG. 1, and executed with the function modules showed in FIG. 2-FIG. 3.

At block 600, the multi-media device 20 communicates with the mobile device 10, the display device 30 and the remote communication device 11.

At block 602, the controlling module 200 sends control commands to the mobile device 10, the display device 30 and the remote communication device 11 to obtain the configuration information of the hardware of the mobile device 10, the display device 30 and the remote communication device 11. The configuration information of the hardware of the mobile device 10 includes the configuration information of the microphone, the camera and the loudspeaker.

At block 604, the invoking module 202 invokes the configuration information of the microphone 104 of the mobile device 10, then sends invoking commands to the mobile device to activate the microphone 104 of the mobile device 10 to obtain the first voice data. In addition, the invoking module 202 also invokes the configuration information of the camera of the mobile device 10, and activates the camera 106 to capture the first image data. After the first voice data and the first image data is obtained, the mobile device 10 sends the voice data and the first image data through a dispatcher 100 located in the application level of the mobile device 10 to the communication module 204 of the multi-media device 20 via the wireless network 111.

At block 606, the communication module 204 of the multi-media device 20 receives the first voice data and the first image data, then sends the first voice data and the first image data to the transforming module 206 located in the drive level.

At block 608, the transforming module 206 decodes the first voice data according to the appropriate code form of the mobile device 10, then encodes the decoded first voice data into second voice data recognizable by the remote communication device 11 according to the configuration information of the hardware of the remote communication device 11. Then the transforming module 206 sends the second voice data to the application module 208 located in the application level. The transforming module 206 decodes the first image data according to the appropriate code form of the mobile device 10, then encodes the decoded first image data into second image data recognizable by remote communication device 11 according to the configuration information of the hardware of the remote communication device 11. In addition, the transforming module 206 also encodes the decoded first image data into third image data recognizable by the display device 30 according to the configuration information of the hardware of the display device 30.

At block 610, the application module 208 sends the second voice data and the second image data via the wireless network 111 to the remote communication device 11 to play, and sends the third image data to the display device 30 to play.

Figure 7:
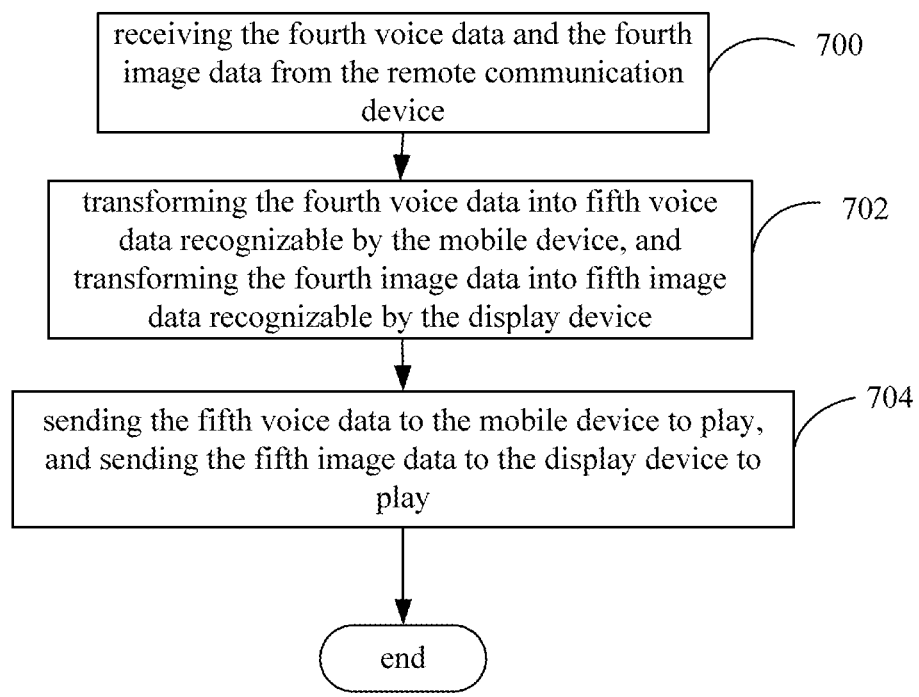
FIG. 7 is a flowchart of processes of a multi-media device transmitting voice data and image data from a remote communication device to a mobile device and a display device, in accordance with one embodiment of the disclosure.

FIG. 7 is a flowchart of processes of the multi-media device 20 transmitting the voice data and the image data from the remote communication device 11 to the mobile device 10 and the display device 30, in accordance with one embodiment of the disclosure. The processes show in FIG. 7 are executed in the environment showed in FIG. 1, and executed with the function modules showed in FIG. 2-FIG. 3.

At block 700, the application module 208 sends the fourth voice data and the fourth image data to the transforming module 206 after receiving such data from the remote communication device 11.

At block 702, the transforming module 206 decodes the fourth voice data according to the appropriate code form of the remote communication device 11, then encodes the decoded fourth voice data into fifth voice data recognizable by the mobile device 10 according to the configuration information of the hardware of the mobile device 10. Then the transforming module 206 sends the fifth voice data to the communication module 204. The transforming module 206 also decodes the fourth image data according to the appropriate code form of the remote communication device 11, then encodes the decoded fourth image data into fifth image data recognizable by the display device 30 according to the configuration information of the hardware of the display device 30. Then the transforming module 206 sends the fifth image data to the communication module 204.

At block 704, the communication module 204 sends the fifth voice data and the fifth image data to the dispatcher 100 of the mobile device 10. The dispatcher 100 sends the fifth voice data to the loudspeaker 102 to play after the fifth voice data is received, and sends the fifth image data to the display device 30 to play.

In the above-described embodiments of the present disclosure, the multi-media device 20 with the video communication method can obtains the configuration information of the hardware of the microphone, the camera and the loudspeaker of the mobile device, and invokes the corresponding drive programs according to the configuration information of the hardware of the microphone and the camera to reach that the multi-media device 20 could obtain a voice data and a image data without a microphone and a camera. And the multi-media device 20 transforms the voice data and the image data into another voice data and another image data recognizable by a remote communication device 11 to make a remote video communication with the remote communication device 11.

What is claimed is:

1. A multi-media device communicated with a mobile device and a remote communication device, the multi-media device comprising:
    at least one processor;
    a non-transitory storage system coupled to the at least one processor and configured to store one or more programs that are executed by the at least one processor, the one or more programs including instructions for:
    sending control commands to the mobile device and the remote communication device to obtain information (or data) about a hardware configuration of the mobile device and the remote communication device;
    sending commands to the mobile device to invoke the information about the hardware configuration of the mobile device;
    controlling, according to the invoking commands, the mobile device to obtain a first voice data and a first image data and to send the first voice data and the first image data to the multi-media device;
    receiving the first voice data and the first image data from the mobile device;
    transforming the first voice data and the first image data into second voice data and second image data recognizable by the remote communication device;
    sending the second voice data and the second image data to the remote communication device;
    sending control commands to the display device to obtain the information about the hardware configuration of the display device;
    transforming the first image data into third image data recognizable by the display device; and
    sending the third image data to the display device.

2. The multi-media device of claim 1, wherein the one or more programs further include instructions for:
    receiving fourth voice data and fourth image data form the remote communication device;
    transforming the fourth voice data into a fifth voice data recognizable by the mobile device, and transforming the fourth image data into a fifth image data recognizable by the display device; and
    sending the fifth voice data to the mobile device and sending the fifth image data to the display device.

3. The multi-media device of claim 2, wherein the one or more programs further include instructions for:
    decoding the fourth voice data according to the appropriate code form, and encoding the decoded fourth voice data into the fifth voice data recognizable by the mobile device according to the information about the hardware configuration of the mobile device; and
    decoding the fourth image data according to the appropriate code form, and encoding the decoded fourth image data into the fifth image data recognizable by the display device according to the information about the hardware configuration of the display device.

4. The multi-media device of claim 1, wherein the one or more programs further include instructions for:
    decoding the first voice data according to the appropriate code form, and encoding the decoded first voice data into the second voice data recognizable by the remote communication device according to the information about the hardware configuration of the remote communication device; and
    decoding the first image data according to the appropriate code form, and encoding the decoded first image data into the second image data recognizable by the remote communication device according to the information about the hardware configuration of the remote communication device.

5. The multi-media device of claim 1, wherein the mobile device include a microphone, a camera and a loudspeaker, and the information about the hardware configuration of the mobile device include the configuration information of the microphone, the camera and the loudspeaker of the mobile device.

6. The multi-media device of claim 5, wherein the one or more programs further include instructions for:
    invoking the configuration information of the microphone of the mobile device, controlling the microphone to recording to obtain the first voice data; and
    invoking the configuration information of the camera of the mobile device, controlling the camera to capture the first image data.

7. A video communication method, applied on a multi-media device, wherein the multi-media device is communicated with a mobile device and a remote communication device, the video communication method comprising:
    sending control commands to the mobile device and the remote communication device to obtain hardware configuration information of the mobile device and the remote communication device;
    sending invoking commands to the mobile device to invoke the information about the hardware configuration of the mobile device;
    controlling the mobile device to obtain first voice data and first image data and to send the first voice data and the first image data to the multi-media device;
    receiving the first voice data and the first image data from the mobile device;
    transforming the first voice data and the first image data into second voice data and second image data recognizable by the remote communication device;
    sending the second voice data and the second image data to the remote communication device;
    sending control commands to the display device to obtain the information about the hardware configuration of the display device;
    transforming the first image data into third image data recognizable by the display device;
    sending the third image data to the display device.

8. The method of claim 7, further comprising:
receiving fourth voice data and fourth image data form the remote communication device;
transforming the fourth voice data into fifth voice data recognizable by the mobile device, and transforming the fourth image data into fifth image data recognizable by the display device; and
sending the fifth voice data to the mobile device and sending the fifth image data to the display device to play.

9. The method of claim 8, further comprising:
decoding the fourth voice data according to the appropriate code form, and encoding the decoded fourth voice data into the fifth voice data recognizable by the mobile device according to the information about the hardware configuration of the mobile device; and
decoding the fourth image data according to the appropriate code form, and encoding the decoded fourth image data into the fifth image data recognizable by the display device according to the information about the hardware configuration of the display device.

10. The method of claim 7, further comprising:
decoding the first voice data according to the appropriate code form, and encoding the decoded first voice data into the second voice data recognizable by the remote communication device according to the information about the hardware configuration of the remote communication device; and
decoding the first image data according to the appropriate code form, and encoding the decoded first image data into the second image data recognizable by the remote communication device according to the information about the hardware configuration of the remote communication device.

11. The method of claim 7, wherein the mobile device includes a microphone, a camera and a loudspeaker, and the information about the hardware configuration of the mobile include the configuration information of the microphone, the camera and the loudspeaker of the mobile device.

12. The method of claim 11, further comprising:
invoking the configuration information of the microphone of the mobile device, controlling the microphone recording to obtain the first voice data; and
invoking the configuration information of the camera of the mobile device, controlling the camera to capture the first image data.

* * * * *